June 8, 1965  H. L. BOWDITCH  3,187,641
DIAPHRAGM
Filed May 23, 1962

INVENTOR
Hoel L. Bowditch
BY
Curtis Morris + Safford
ATTORNEYS

United States Patent Office 3,187,641
Patented June 8, 1965

3,187,641
DIAPHRAGM
Hoel L. Bowditch, Foxboro, Mass., assignor to The Foxboro Company, Foxboro, Mass.
Filed May 23, 1962, Ser. No. 196,956
5 Claims. (Cl. 92—94)

This invention relates to flexible diaphragms. More in particular, this invention relates to metal diaphragms useful for measuring differential pressures and the like.

A wide variety of industrial instruments have been developed over the years using flexible metal diaphragms in a number of ways. For example, many instruments employ diaphragms to sense the differential pressure developed across an orifice plate inserted in a stream of flowing fluid, thereby to determine the flow rate of the fluid. A typical force-balance instrument of this type is shown in U.S. Patent 2,806,480, issued to the present applicant on September 17, 1957.

Conventional diaphragms (one class of which is referred to as the "NACA" diaphragm) are not entirely satisfactory for making precision measurements of differential pressure, particularly because such diaphragms have an undesirable amount of residual springiness. This spring action can produce reading errors in an instrument like that shown in the above-mentioned patent, especially as a result of changes in ambient temperature. That is, expansion and contraction of operating parts due to temperature changes tends to displace physically the "force bar" or other sensing element attached to the center of the diaphragm. The consequent shift in position of the diaphragm alters the spring force applied by the diaphragm to the sensing element, thereby creating a change in the reading of the instrument just as though there had been a change in the differential pressure to which the diaphragm is subjected.

It also is important for instrument applications that the effective area of the diaphragm remain substantially constant over a moderately wide range of diaphragm deflections. In the NACA class of diaphragms, for example, such a characteristic is obtained by forming one or more deep annular corrugations in the unsupported area of the diaphragm. However, as noted in U.S. Patent 2,747,615, when a metal diaphragm is constructed in this fashion, its movement becomes stiff and unsuitable for precision measurements. Moreover, if such a corrugated diaphragm is deflected substantially, the unsupported area of the diaphragm becomes excessively distorted with a tendency to wrinkle, thereby introducing unacceptable nonlinearity and other adverse effects. In an attempt to avoid such difficulties, Patent 2,747,615 teaches that the corrugations should be slotted and that the slots should be sealingly covered with a layer of fluid-impermeable material to prevent the passage through the diaphragm slots of the fluids on opposite sides thereof. However, such a diaphragm construction has not been satisfactory, in part because of its complexity and resultant high cost of manufacture.

Accordingly, it is an object of this invention to provide an improved diaphragm particularly adapted for use in industrial measuring instruments such as a force-balance device for sensing differential pressures. A more specific object of this invention is to provide such a diaphragm which has an extremely low spring rate, thereby to assure low measurement errors resulting from changes in ambient temperature, and which can be manufactured economically. Other objects, aspects and advantages of the invention will be in part pointed out in, and in part apparent from, the following description of a preferred embodiment of the invention, considered together with the accompanying drawings, in which:

Figure 1:
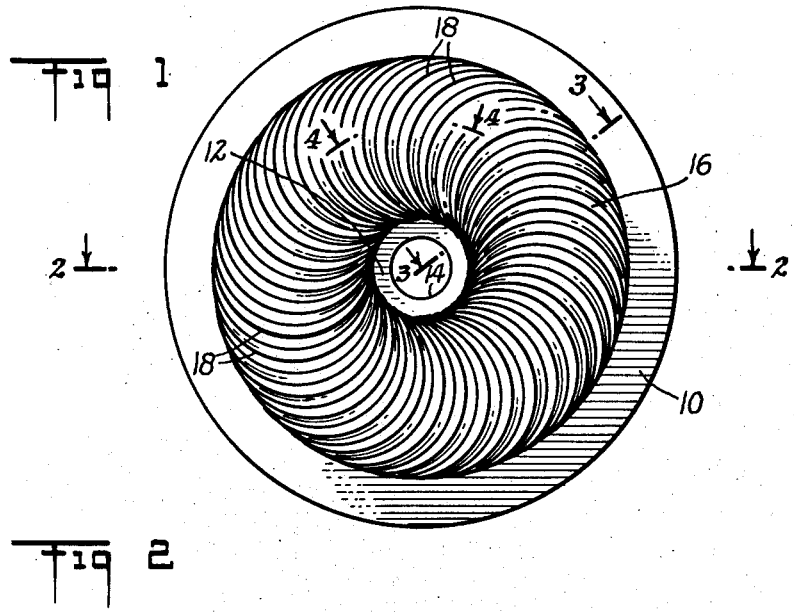
FIGURE 1 is a plan view of a circular diaphragm formed in accordance with the present invention.
Figure 2:
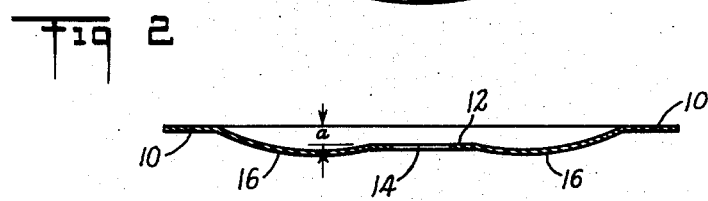
FIGURE 2 is a sectional view taken along line 2—2 of FIGURE 1 showing the diaphragm in its relaxed state and omitting any showing of the crescent-shaped ridges of FIGURE 1.

Referring now to FIGURES 1 and 2, the diaphragm of the present invention is a one-piece circular unit of thin flexible metal such as beryllium-copper, and is formed with an outer flat flange part 10 adapted to be supported by the instrument in which the diaphragm is being used. The inner or center part 12 of the diaphragm also is flat, and is provided with a small hole 14 simply to aid in making mechanical connection to the diaphragm. Between the outer and inner parts 10 and 12, the metal of the diaphragm is drawn in the form of a relatively deep annular corrugation 16 the spring action of which, when the diaphragm is in its relaxed state as seen in FIGURE 2, causes the inner part 12 to be offset from the plane of the flange part 10.

Figure 3:
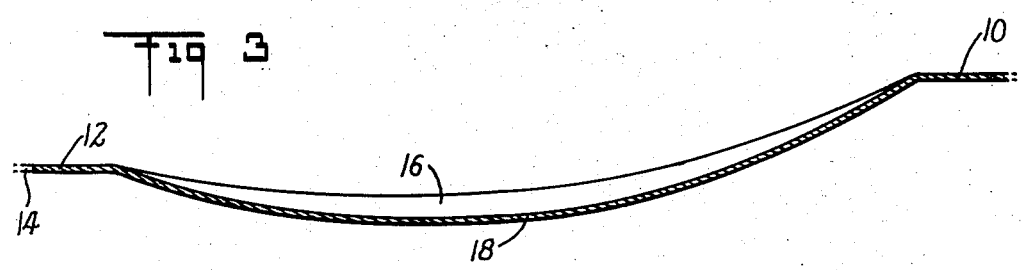
FIGURE 3 is a detail section taken along line 3—3 of FIGURE 1. (NOTE.—Line 3—3 extends along the valley between two of the crescent-shaped ridges.)
Figure 4:
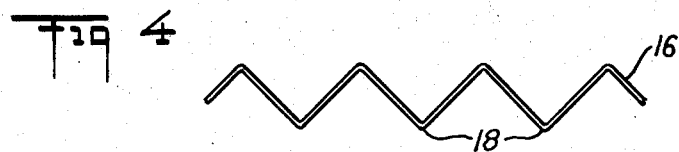
FIGURE 4 is a detail section taken along the arc line 4—4 of FIGURE 1.

The corrugated portion 16 of the diaphragm also is formed with a great number of crescent-shaped ridges 18 the ends of which are smoothly faired tangentially into the outer flange 10 and the center part 12. (NOTE.— FIGURE 2 has been drawn to avoid any showing of these ridges, in order to illustrate more clearly the basic outline of the annular corrugation.) As shown in FIGURE 3, the height of these ridges is maximum near the midpoint between the flange part 10 and the center part 12, and decreases smoothly to essentially zero height at the points of tangency at the ends. FIGURE 4, a cross-section taken along a central arc of the corrugation 16 at the point of maximum ridge height, shows that the ridges are formed somewhat in the nature of an accordion-pleat, and thus are adapted to provide flexible hinge action circumferentially around the arc line.

In the particular embodiment of the invention found to be satisfactory, the angle between adjacent sides of the ridges was 90°, and there were 60 such ridges having a maximum height of .026" and a valley-to-valley spacing of .052"; the outer diameter of the flange 10 was 2", the inner diameter of the flange was 1.625", and the diameter of the center part 12 was .375"; the offset between the center part and the plane of the flange (identified as $a$ in FIG. 2) was .065". The diaphragm was formed with the ridges 18 by means of a high-pressure die arrangement shaped in conformance with the desired ridge configuration.

In a deeply-corrugated diaphragm without the formed ridges 18, e.g. as shown in FIGURE 2, it will be found that any substantial deflection of the center part 12 towards the plane of the flange 10 will produce severe wrinkling of the annular corrugation 16 and unacceptable non-linearity in the operation of the diaphragm. Apparently this is due to the development of hoop stresses around the corrugated portion. Such hoop stresses result from the fact that, as the diaphragm is deflected, the metal of the corrugation tends to move radially towards the inner part 12. If a circular segment of metal particles be considered, it will be seen that the radial movement resulting from deflection of the diaphragm tends to reduce the diameter of that particular segment, and thereby tends to compress the metal of that segment into a smaller volume. The resistance of the metal to such compression is what produces the undeired stresses and, ultimately, wrinkling of the corrugation.

This difficulty is effectively alleviated by means of the ridges 18. These ridges, which are provided around the full extent of the annular corrugation 16, have portions which extend in a direction between the outer flange 10 and the inner part 12, i.e. in a direction perpendicular to a circumferential arc, and the accordion-pleat shaping of these ridges, as seen in FIGURE 4, provides circumferential flexibility. Therefore, as the diaphragm is deflected, the ridges contract or expand, towards or away from one another, with a hinge-action which absorbs the stresses induced by the diaphragm deflection.

In accordance with another aspect of the present invention, the ridges 18 are crescent-shaped with their ends tangentially faired into the flange part 10 and the center part 12. This tangential relationship provides good flexibility, i.e. hinge-action, at these points in order to accommodate extensive deflection of the diaphragm. On the other hand, substantial rigidity is maintained in the central regions of the corrugated portion due to the fact that in these regions the ridges extend radially, or very nearly so.

It has been found that the inner and outer portions of the corrugated portion 16, i.e. the segments which are near the parts 10 and 12, do not experience any substantial hoop stresses because there is not much radial movement of the metal in these regions when the diaphragm is deflected. For that reason, the height of the ridges 18 is made smaller in these inner and outer portions, thereby accommodating the smoothly-faired tangential arrangement at the ends of the ridges. The maximum radial movement of the diaphragm metal occurs near the midpoint between the flange 10 and the center part 12, and it is at this point that the height of the ridges is at a maximum in order to provide optimum circumferential flexiblity for this more highly-stressed region.

Figure 5:
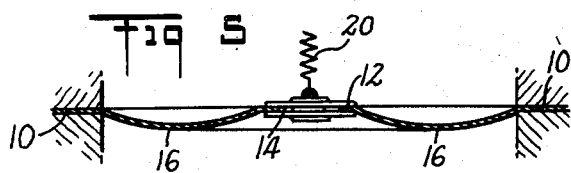
FIGURE 5 shows the diaphragm as in FIGURE 2, but in operating position, with its center part aligned with the outer flange.

Referring now to FIGURE 5, in accordance with a further aspect of the invention, the diaphragm preferably is operated with its center part 12 lying in the plane of the outer flange 10. The diaphragm may, for example, be so conditioned by any conventional spring loading, indicating herein diagrammatically at 20. Under there circumstances, it will be found that the spring rate of the diaphragm will be reduced many times below its normal spring rate. Although a detailed theoretical explanation of the dihpragm operation in this regard undoubtedly would be complex, in effect there appears to be an "over-center" action wherein the spring forces tending to restrain the deflection of the diaphragm are essentially counterbalanced by other spring forces tending to "snap" the diaphragm through a neutral position, somewhat the same as occurs in a conventional oil can.

In any event, with the spring rate of the diaphragm thus reduced nearly to zero, moderate variations in the diaphragm position can be made without introducing any substantial change in the reaction force of the diaphragm. In other words, the diaphragm is "floppy" in its response to deflection of the center part 12, and therefore does not cause any substantial error in the reading of an associated instrument if the deflection of the diaphragm is altered by external effects, e.g. as a result of variations in ambient temperature.

Although a preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. A diaphragm comprising an outer flange part and an inner part to be deflected relative to said outer part, said diaphragm including an arc-shaped flexible element joining said inner and outer parts; said flexible element being formed with a groove-like corrugation extending transversely between said parts and providing an offset between said inner part and the plane of said outer flange part when the diaphragm is in its relaxed state; means for relieving hoop stresses in said flexible element when said inner part is deflected towards the plane of said outer flange; and means holding said inner part at least adjacent the plane of said outer flange in a position to minimize the spring reaction force applied by said flexible element to said inner part.

2. A one-piece diaphragm comprising a circular outer flange and a circular inner part to be deflected relative to said outer flange, the flexible element between said flange and said inner part being formed with an annular corrugation and providing an offset between said inner part and the plane of said outer flange when the diaphragm is in its relaxed state; means comprising a plurality of ridges for relieving hoop stresses in said flexible element when said inner part is deflected towards the plane of said outer flange; and spring means holding said inner part in a position to minimize the spring reaction force applied by said flexible element to said inner part.

3. For use in a fluid pressure responsive device, a metal diaphragm comprising an outer circular flange element adapted to be gripped within an instrument casing, an inner circular element to be deflected relative to said outer flange element, said outer and inner elements being coaxial and joined by a thin flexible circular part which appears slightly bowed when viewed in cross-section along a line running radially between said inner and outer circular elements, said flexible circular part being formed with a plurality of side-by-side crescent-shaped ridges each extending in a continuous arc between said inner and outer circular elements, the ends of said ridges being faired tangentially into said inner and outer circular elements respectively, each of said ridges having a central portion which extends in a radial direction with reference to said inner and outer circular elements.

4. For use in a fluid pressure responsive device, a metal diaphragm comprising an outer circular flange element adapted to be gripped within an instrument casing, an inner circular element to be deflected relative to said outer flange element, said outer and inner elements being coaxial and joined by a thin flexible part comprising a concentric annular band which appears slightly bowed when viewed in cross-section along a line running radially between said inner and outer circular elements, said annular band being formed with a plurality of side-by-side corrugations the walls of which are smooth and free from discontinuities throughout the entire extent thereof, each of said corrugations extending between the inner and outer edges of said annular band and the depth of said corrugations varying from a minimum adjacent said inner edge to a maximum at a central region of said band to a minimum at said outer edge, the ends of said corrugations joining the portions of said diaphragm next to said annular band at an angle substantially less than a right angle when viewed in said cross-section along a line running radially between said inner and outer circular elements.

5. A diaphragm as claimed in claim 4, wherein the portions of said corrugations in said central region extend in a radial direction with respect to said circular elements.

References Cited by the Examiner

UNITED STATES PATENTS

| 56,694 | 7/66 | Blake | 92—104 |
|---|---|---|---|
| 805,720 | 11/05 | Fulton | 92—40 |
| 1,793,621 | 2/31 | Kelley | 137—795 |
| 2,874,569 | 2/59 | Gray | 73—406 XR |

FOREIGN PATENTS

| 749,551 | 5/56 | Great Britain. |
|---|---|---|
| 564,300 | 10/58 | Canada. |

FRED E. ENGELTHALER, *Primary Examiner.*

EMILE PAUL, *Examiner.*